March 30, 1943.   K. G. ANDERSON   2,315,103
ANTIGLARE WINDOW PANE
Filed Sept. 16, 1940
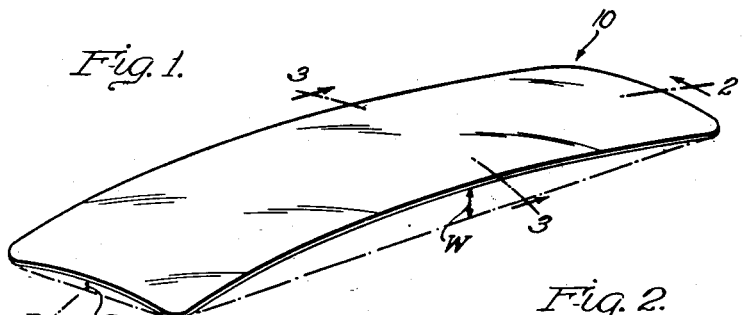
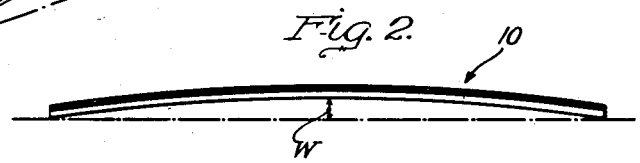
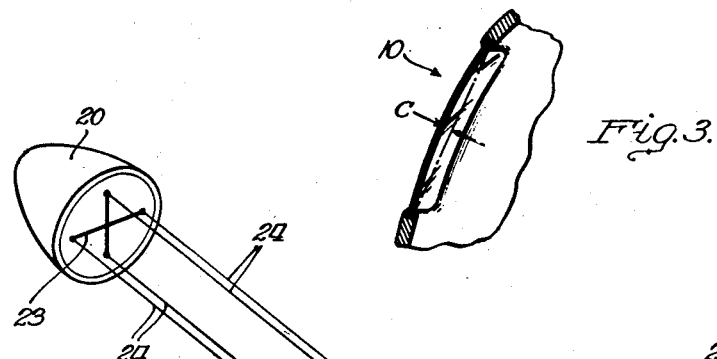
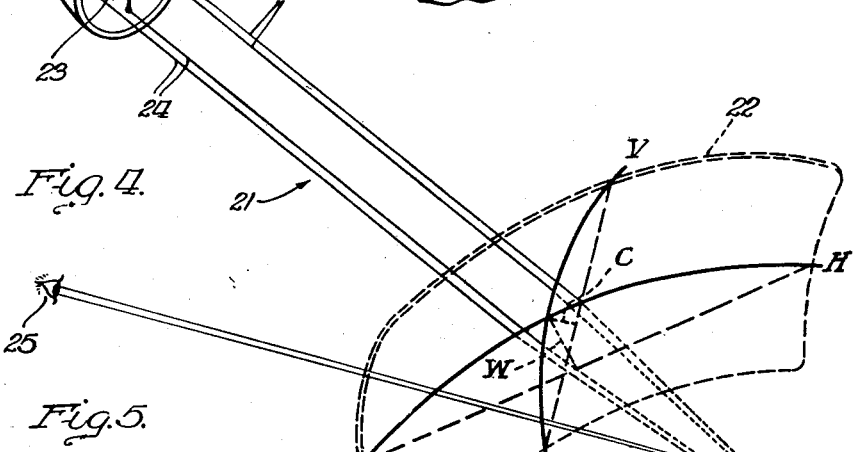
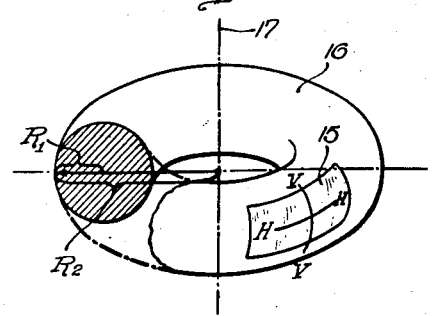
INVENTOR.
Kador George Anderson
BY Soans, Pond, + Anderson
Attys.

Patented Mar. 30, 1943

2,315,103

UNITED STATES PATENT OFFICE 2,315,103

ANTIGLARE WINDOW PANE

Kador George Anderson, Chicago, Ill.

Application September 16, 1940, Serial No. 356,912

7 Claims. (Cl. 88—1)

My invention relates, generally, to anti-glare devices, and it has particular relation to an improved type of window for automobiles and the like which greatly reduces and in many instances eliminates glare due to light reflected therefrom.

It is widely recognized in connection with automobile driving that reflected glare from the rear window of a leading car is often a very irritating and troublesome annoyance, and in certain cases the blinding effect of such glare may be the direct or at least a contributing cause of accidents. The glare is most noticeable and annoying to the driver of the next following car and may be due to reflection of light from a number of sources. Often on bright days, when driving away from the sun, it will be reflected in a concentrated glare from the rear window of a leading car. Perhaps, somewhat more serious and more common is the blinding glare received by a driver during night driving from the rear window of a leading car due to reflection of light from his own headlights, or from headlights of cars in his rear.

Although the automobile manufacturers have recognized a need for meeting this problem and have adopted certain different types of rear windows in an attempt to eliminate or reduce the same, heretofore no simple, economical, and practical solution has been provided.

The object of my invention, generally stated, is to provide windows for automobiles and the like of a construction, capable of practical and economical production, which substantially eliminate the annoyance due to window glare in connection with automobile driving. My improved windows are particularly adapted to be used for the rear windows of automobiles so as to greatly reduce the glare therefrom.

According to my invention a two-way, or double curved pane is used in the front or rear window of automobiles. These panes have a curved contour, with no element of the surface being a straight line.

For a more complete understanding of the nature and scope of my invention, reference may be had to the following detailed description taken in connection with the accompanying drawing in which:

Fig. 1 is a perspective view of a window pane illustrating one embodiment of my invention;

Fig. 2 is a longitudinal sectional view taken on line 2—2 of Fig. 1;

Fig. 3 is a vertical sectional view taken on line 3—3 of Fig. 1 and showing the window pane in place in the rear window of an automobile;

Fig. 4 is a view showing diagrammatically the principle of my invention; and,

Fig. 5 is a perspective view of a toroid or torus with a surface outlined thereon corresponding to the shape of the pane of Fig. 1.

Referring to Figs. 1, 2, and 3 of the drawing, a window pane is indicated generally at 10 having a two-way or double curved shape. The window pane 10 may be made of glass or other suitable transparent material. If desired, it may take the form of safety glass having two layers of glass separated by a layer of special transparent plastic.

The pane 10 may take the dimensions of an ordinary rear window for an automobile, or may be in any other desired size. For example, the pane 10 may be 36" in length and 12" in width. The longitudinal curvature dimension W in such a pane may be 1", while the crosswise curvature dimension C may be ½". It will be understood that the foregoing dimensions are illustrative and that window panes having similar dimensions may be made within the purview of my invention.

It will be seen that the pane 10 is curved in two directions. That is, it is curved both lengthwise, and crosswise. Due to this double curving, the surface of the pane has no element in any direction which is a straight line.

The pane corresponds in shape to a portion of a surface of generation formed by the movement of one conic or other curve along a second and different conic or other curve as, for instance, an area on the outer surface of a toroid or torus, an ellipsoid or a paraboloid. The pane is preferably of uniform thickness throughout so as to have no lens effect.

Furthermore, from an examination of Fig. 4 of the drawing, it will be seen that the normal from any chord of the pane to its subtended arc is considerably shorter than the chord. It is understood that the word "arc" is used broadly herein as indicating any curve. The normal W between the arc H—H and its chord H—H is considerably shorter than said chord; and the normal C between the arc V—V and its chord V—V is considerably shorter than said last mentioned chord.

In the form shown in Fig. 5, the pane corresponds to an area 15 on the outer surface of a toroid 16, although it is to be understood that the pane may correspond to any surface of generation formed by the movement of one conic or other curve along a second and different conic or other curve.

The toroid or torus 16 may be formed by revolving a circle, or other closed curve about a vertical axis 17. The axis of revolution may or may not cut the revolved generating curve. It will be seen that the area 15 is oblong in shape, and extends lengthwise in a direction generally parallel to the plane of revolution of the generating curve of the toroid 16. The radius of curvature of the pane 10 in its lengthwise direction is greater than the radius of curvature in its crosswise direction. This will be seen on reference to Fig. 5 where $R_1$ is the radius of curvature in crosswise direction while $R_2$ is the radius of curvature in a lengthwise direction. It will also be seen that the radius of curvature of the surface 15 or of the pane 10, in any direction is substantially greater than the dimension of the surface or pane in that direction.

In order to understand more fully the antiglare properties of window panes made according to this invention, reference may be had to Figure 4 of the drawing. A head lamp 20, representing a head light of an automobile, is shown with a light beam 21 projected therefrom onto the outside surface of a two-way curved pane 22 outlined in broken lines and forming one embodiment of the invention. The arcs H—H, and V—V respectively drawn on the pane 22 correspond with similar arcs drawn on the area 15 in Figure 5. As glare from the rear windows of automobiles and the like is due to light reflection, the pane 22 may be considered as a mirror. A cross 23 is drawn in the front of the head lamp 20 with light rays indicated by the lines 24 radiating from the points of the cross 23 and striking the pane 22 normal to the surface thereof. The light beam 21 is reflected from the surface of the pane 22 into the eye of an observer, indicated at 25. In actuality the eye 25 would be that of the driver of a following car. The eye 25 will see the cross 23 as a two-way diminished virtual image 23' which appears to be in the rear of the pane 22. It will be seen therefore that when this improved pane is used for instance as the rear window of a vehicle, the two headlights of a following vehicle will be reflected in the rear pane of the forward vehicle merely as two small points, thus eliminating objectionable glare to the driver of the following vehicle.

In tests of the invention it was found that under conditions most favorable for glare, only a small bright spot was formed on my two-way curved window panes. And these spots were apparent only when the panes were in a certain position, and disappeared on slight movement of the panes. Hence, glare is reduced to a minimum or entirely eliminated, and such glare as there is is not annoying. This is a marked improvement on prior anti-glare window panes in which the bright spots were much larger and were existent through a much wider range of positions of the panes.

Since certain changes may be made in the foregoing constructions and different embodiments of the invention may be made without departing from the scope thereof, it is intended that all matter described hereinbefore or shown in the accompanying drawing shall be interpreted as illustrative and not in a limiting sense, and that the claims be given the broadest construction consistent with the prior art.

I claim as my invention:

1. A transparent, anti-glare, vehicle window pane curved in the same direction throughout both of its dimensions, the transverse curvature being materially less than the longitudinal curvature.

2. A transparent, anti-glare, vehicle window pane curved in the same direction throughout both of its dimensions, the transverse curvature being approximately one-half of the longitudinal curvature.

3. A transparent, anti-glare, oblong, vehicle window pane curved in the same direction throughout both of its dimensions, the transverse curvature being materially less than the longitudinal curvature.

4. A transparent, anti-glare, vehicle window pane curved in the same direction throughout both of its dimensions and being of uniform thickness throughout, the transverse curvature being materially less than a longitudinal curvature.

5. A transparent, anti-glare, double-curved vehicle window pane, said pane corresponding in shape to an area on the outer surface of a toroid.

6. A transparent, anti-glare, double-curved vehicle window pane of uniform thickness throughout, said pane corresponding in shape to an area on the outer surface of a toroid.

7. A transparent, anti-glare, double-curved, oblong vehicle window pane of uniform thickness throughout, said pane corresponding in shape to an area on the outer surface of a toroid.

KADOR GEORGE ANDERSON.

Disclaimer 2,315,103.—*Kador George Anderson*, Chicago, Ill. ANTI-GLARE WINDOW PANE. Patent dated Mar. 30, 1943. Disclaimer filed Jan. 24, 1952, by the inventor, owner of one-half interest, and the assignee, *John Henehan*, owner of one-half interest.

Hereby enter this disclaimer to all and every part of the specification including claims 1, 2, 3, 4, 5, 6, and 7, of said patent.

[*Official Gazette February 19, 1952.*]